April 20, 1954

L. F. DALTON 2,676,040

DOUBLE LIP SEAL RING

Filed Oct. 9, 1950

LESTER F. DALTON,
INVENTOR.

BY Lyon Lyon

ATTORNEYS

Patented Apr. 20, 1954

2,676,040

UNITED STATES PATENT OFFICE 2,676,040

DOUBLE LIP SEAL RING

Lester Frank Dalton, Torrance, Calif.

Application October 9, 1950, Serial No. 189,099

2 Claims. (Cl. 286—5)

This invention relates to sealing devices and is particularly directed to improvements in an annular seal element having two axially spaced and oppositely directed sealing lips.

An important object of this invention is to provide a seal ring formed of natural or synthetic rubber or composition thereof having a central annular chamber and a pair of oppositely directed axially spaced sealing lips defining the sides of the chamber.

Another object is to provide a seal ring of this type having superior qualities for forming a rotary seal with respect to a shaft.

Another object is to provide such a rotary seal for a bearing assembly or the like which is particularly adapted for retaining lubricant and/or preventing entrance of foreign matter.

Other and more detailed objects and advantages will appear more fully hereinafter.

Figure 1:
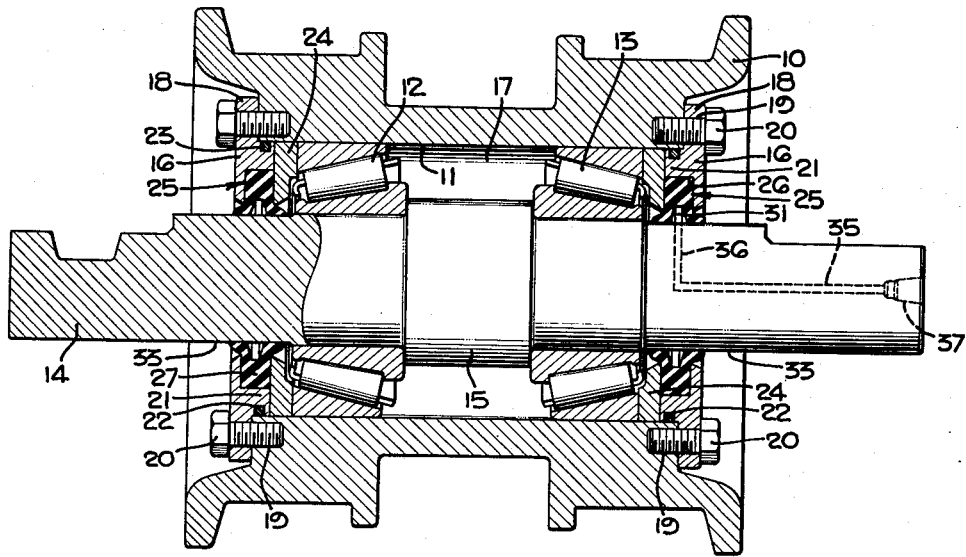
Figure 1 is a sectional view showing a bearing assembly and employing seal rings embodying my invention.
Figure 2:
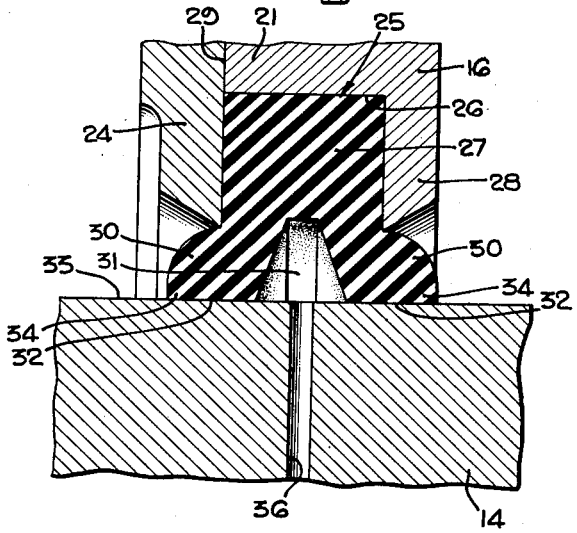
Figure 2 is a sectional view showing an enlarged portion of Figure 1 and showing the double lip seal ring of my invention in operative position with respect to the rotary shaft.

Referring to the drawings, the bearing assembly shown in Figure 1 illustrates the use of my improved form of seal ring in connection with a roller assembly for a track-laying tractor. This particular environment for my seal ring is chosen only for purposes of illustration and not by way of limitation. In the device illustrated the roller 10 is provided with a central axial bore 11 which receives the outer races of the tapered bearing assemblies 12 and 13. A nonrotary pin or shaft 14 is normally secured to the frame of the tractor, and this shaft extends through the bore 11 and projects on both sides of the roller 10. The shaft is provided with a central enlargement 15 which provides an abutment for the inner races of the bearing assemblies 12 and 13. The roller 10 is thus rotatably supported on the stationary shaft 14.

Duplicate end caps 16 are provided at each end of the bore 11 for maintaining the bearing assemblies in position and for providing sealing means to prevent escape of grease or other lubricant from the chamber 17 within the bore 11. Each of these end caps 16 is provided with a circular flange 18 having a series of apertures 19 extending therethrough. Threaded attachment elements 20 extend through the apertures 19 into threaded engagement with the material of the roller 10 to maintain the end caps in position. Each end cap 16 is also provided with an axial portion 21 which fits within the bore 11. This axially extending portion 21 may be provided with a groove 22 to receive an O ring 23 or other form of sealing device. The axially extending portion 21 contacts a spacer plate 24 which in turn contacts the outer race of one of the bearing assemblies.

In accordance with my invention a novel form of seal ring generally designated 25 is positioned within a recess 26 defined between each of the end caps 16 and spacer plates 24. The seal ring 25 has a massive annular body portion 27 defined between radial side walls 36. The body 27 is clamped between the spacer plate 24 and the skirt 28 on the end cap 16. The amount of compression of the body 27 is limited by the metal-to-metal engagement between the shoulder 29 and the spacer plate 24, but it is sufficient to clamp the ring 25 against relative rotation with respect to the roller 10.

Figure 3:
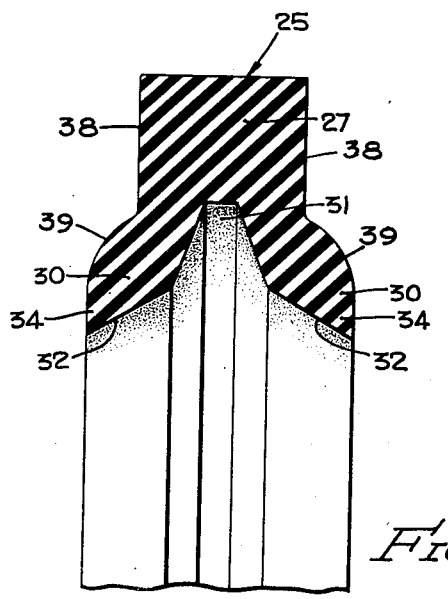
Figure 3 is a sectional view partly broken away showing the initial unstressed shape of the seal ring before installation.

A pair of circular sealing lips 30 extends radially inwardly from the body 27 and projects symmetrically in opposite directions. The lips 30 each have a convex outer surface 39 and the lips co-operate to form the side boundaries of a central groove 31 provided in the seal ring 25. In the initial unstressed condition as shown in Figure 3 each of the lips is provided with a frusto-conical sealing surface 32 which extends from a relatively large diameter adjacent the groove 31 to a relatively small diameter adjacent an outer edge of the seal ring 25. When the ring 25 is installed around the shaft 14 the rotary sealing surface 33 on the shaft 14 deforms the lips until the surfaces 32 become cylindrical and coincide with the surface 33 on the shaft. In this position the plane of each side wall 36 passes intermediate the ends of the sealing surface 32 of its respective lip 30. The hoop tension stresses in the lips 30 increase in proportion to the degree of stretching occasioned by installing the seal ring 25 around the shaft 14. Consequently the hoop tension stresses are greatest in the lips 30 near the outer ends 34 and are smallest adjacent the central groove 31. The result is that the outer tips 34 of the lips 30 are maintained in tight sealing contact with the surface 33 on the shaft 14.

The central groove 31 is initially filled with grease or other lubricant, and actual service in the field has demonstrated that this initial supply of lubricant enables the seal ring 25 to give satisfactory service for an exceptionally long period of use. This double lip ring 25 has given remarkable service in the particular installation shown and is highly successful in preventing entrance of foreign matter such as dust, dirt, grit, etc. into the bearing chamber 17.

If desired, means may be provided for injecting lubricant into the central groove 31, and as shown in the drawings this means may take the form of an axial passage 35 located in the shaft and communicating with a lateral passage 36 in the shaft leading to the groove 31. A suitable lubricant connection fitting of any desired type may be provided at 37. If desired lubricant can be supplied to both of the seal rings 25 shown in Figure 1 by means of similar axial and lateral passageways formed from the other end of the shaft, or if the other end is not accessible for servicing the axial passage 35 may be extended to a position within the other seal ring 25 and a second lateral passage provided to communicate with it.

Having fully described my invention, it is to be understood that I do not wish to be limited to the details herein set forth, but my invention is of the full scope of the appended claims.

I claim:

1. A seal ring of the type described formed of resilient material and comprising a centrally disposed massive annular body having radial side walls defining parallel planes, a pair of sealing lips formed integrally with the body extending radially therefrom and projecting axially in opposite directions, the lips cooperating to form the side walls of a central groove in the seal ring, each of the lips having a sealing surface which is tapered when the seal ring is in its initial unstressed condition, each of the lips having a convex outer surface extending to the extreme outer end of the lip and merging with one of the side walls of the body, the lips being sufficiently resilient to enable the said lip surfaces to be deformed for the major portion of their length into sealing contact with an axially extending cylindrical member, the plane of each side wall passing intermediate the ends of the sealing surface of its respective lip, whereby the greatest sealing pressure is maintained at the outer end of the lips by the inherent resilience of the material.

2. In a seal ring mounting for sealing an annular space between two relatively rotatable members, the inner member having an external cylindrical surface, the combination of: a seal ring formed of resilient material and having a centrally disposed massive annular body provided with radial side walls defining parallel planes, clamp means on the outer member for clamping the side walls of the body axially to prevent relative rotation of the body and said outer member, a pair of sealing lips formed integrally with the body extending radially therefrom and projecting axially in opposite directions, the lips cooperating to form the side walls of a central groove in the seal ring, each of the lips having a sealing surface which is tapered when the seal ring is in its initial unstressed condition, each of the lips having a convex outer surface extending to the extreme outer end of the lip and merging with one of the side walls of the body, the lips being sufficiently resilient to enable the said lip surfaces to be deformed for the major portion of their length into sealing contact with the cylindrical surface on the inner member, the plane of each side wall passing intermediate the ends of the sealing surface of its respective lip, whereby the greatest sealing pressure is maintained at the outer end of the lips by the inherent resilience of the material.

References Cited in the file of this patent

UNITED STATES PATENTS

| Number | Name | Date |
|---|---|---|
| 2,274,234 | Ekkebus et al. | Feb. 24, 1942 |
| 2,309,446 | Ekkebus | Jan. 26, 1943 |
| 2,402,114 | Le Clair | June 11, 1946 |
| 2,443,332 | Summers | June 15, 1948 |

FOREIGN PATENTS

| Number | Country | Date |
|---|---|---|
| 544,732 | Great Britain | of 1942 |